United States Patent
Hodge et al.

(10) Patent No.: US 7,658,203 B2
(45) Date of Patent: *Feb. 9, 2010

(54) FLUID SENSING SHUT-OFF DEVICES WITH TIMER AND METHODS OF OPERATION

(75) Inventors: Thurman F. Hodge, Woodland Park, CO (US); Benjamin Grill, Woodland Park, CO (US); Oded Eddie Sturman, Woodland Park, CO (US)

(73) Assignee: Enginuity, Inc., Woodland Park, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/402,385

(22) Filed: Mar. 11, 2009

(65) Prior Publication Data

US 2009/0173398 A1    Jul. 9, 2009

Related U.S. Application Data

(63) Continuation of application No. 11/405,808, filed on Apr. 17, 2006, now Pat. No. 7,509,975.

(60) Provisional application No. 60/672,784, filed on Apr. 19, 2005.

(51) Int. Cl.
  *F16K 31/11* (2006.01)
  *F16K 31/08* (2006.01)
  *F16K 17/00* (2006.01)

(52) U.S. Cl. .................. 137/456; 251/65; 251/129.03; 137/487.5

(58) Field of Classification Search .............. 137/456, 137/487.5; 251/65, 129.07–129.22
See application file for complete search history.

(56) References Cited

U.S. PATENT DOCUMENTS

| | | | |
|---|---|---|---|
| 4,501,290 A | 2/1985 | Sturman et al. | |
| 4,878,464 A * | 11/1989 | Richeson et al. | 123/90.11 |
| 6,058,519 A | 5/2000 | Quintana | |
| 6,178,569 B1 | 1/2001 | Quintana | |
| 6,367,096 B1 | 4/2002 | Quintana | |
| 6,481,689 B2 | 11/2002 | Grill | |
| 6,671,893 B1 | 1/2004 | Quintana et al. | |
| 6,820,856 B2 | 11/2004 | Grill | |
| 6,877,170 B1 | 4/2005 | Quintana et al. | |
| 6,934,977 B1 | 8/2005 | Quintana et al. | |
| 2002/0095721 A1 | 7/2002 | Quintana | |
| 2003/0001025 A1 | 1/2003 | Quintana | |
| 2003/0169046 A1 * | 9/2003 | Morris | 324/409 |
| 2004/0017291 A1 * | 1/2004 | Hardman et al. | 340/505 |
| 2004/0149947 A1 * | 8/2004 | Grill | 251/129.05 |

\* cited by examiner

*Primary Examiner*—Stephen Hepperle
*Assistant Examiner*—William McCalister
(74) *Attorney, Agent, or Firm*—Blakely Sokoloff Taylor & Zafman LLP

(57) ABSTRACT

Fluid sensing shut-off devices with timer and methods of operation to shut off fluid flow if a primary shutoff valve sticks in the on condition. An embodiment is disclosed using a microphone to sense fluid flow, with a microprocessor periodically awakening from a sleep mode to power the sensor and determine if there is flow. If there is flow, the microprocessor times flow, and if flow is not shut off within a predetermined length of time, the microprocessor shuts off the valve. The valve itself normally held in a magnetically latched, valve open state, but may be unlatched by a current pulse to close the valve. Various embodiments and applications are disclosed.

28 Claims, 4 Drawing Sheets

FLUID SENSING SHUT-OFF DEVICES WITH TIMER AND METHODS OF OPERATION

CROSS-REFERENCE TO RELATED APPLICATION

This application claims the benefit of U.S. Provisional Patent Application No. 60/672,784 filed Apr. 19, 2005.

BACKGROUND OF THE INVENTION

1. Field of the Invention

The present invention prevents the wasting of water in toilets.

2. Prior Art

Presently, toilet water is being wasted because of faulty flush mechanisms. This invention addresses this problem.

Known automatic fluid shut-off valves include those disclosed in U.S. Pat. No. 4,501,290 issued to Sturman et al. on Feb. 26, 1985. In FIGS. 2-3 of Sturman et al., a pressure regulating electrically operable shut-off valve is shown having a permanent magnet 84 that is used to latch a third magnetic member 98 with a magnet member 82.

Also known automatic fluid shut-off valves, in FIGS. 1-2 of U.S. Pat. No. 6,481,689 B2 issued to Grill on Nov. 19, 2002, there is shown a two-way two-position fluid control valve having a solenoid 48. When the solenoid 48 is electrically actuated, an armature 58 is pulled into contact with a core 56 while a transfer tube 42, and a valve 26 coupled to the transfer tube 42, move from a first (closed) position shown in FIG. 1 to a second (opened) position shown in FIG. 2. While the fluid control valve of Grill is suitable for many applications, the solenoid 48 disclosed therein for both i) electromagnetically pulling the armature 58 (and valve 26) from its closed position to its opened position, and ii) holding the armature 58 (and valve 26) in its opened position may be unsuitable for other applications. For example, it may be too expensive and/or too power consuming for certain automatic fluid shut-off applications, such as those found in various places of the common household.

Also known in U.S. Pat. No. 6,820,856 B2 issued to Grill Nov. 24, 2004, is a two-way two-position control valve assembly operable to manually open and automatically block fluid flow therethrough.

It is therefore desirable to provide a simple, energy-efficient, reliable, relatively inexpensive two-way fluid control valve assembly for various household and commercial applications that senses fluid flow and automatically shuts off the valve when a preset time limit has expired.

The present invention discloses a two-way fluid control valve with a sensor that sense fluid flow and automatically shuts off the valve when a preset time limit has been reached. When fluid flow stops, the timing mechanism resets to zero.

DETAILED DESCRIPTION OF THE PREFERRED EMBODIMENTS

One embodiment of the present invention is its use on the water inlet of a toilet to detect a leaking toilet valve, and shut the running water off after a preset time to prevent the costly and environmentally unwise waste and loss of water.

The sensor could sense fluid by an electronic sensor, by using a probe, by sensing water level, or by detecting fluid flow audibly.

The valve could be reset manually, mechanically, electronically, or automatically.

The fluid valve could shut off a variety of fluid flow, i.e., household water, gardening, irrigation, gas.

The shut-off device could be powered by virtually any source of power, i.e., AC or DC powered, solar, or powered by mechanical means.

Figure 1:
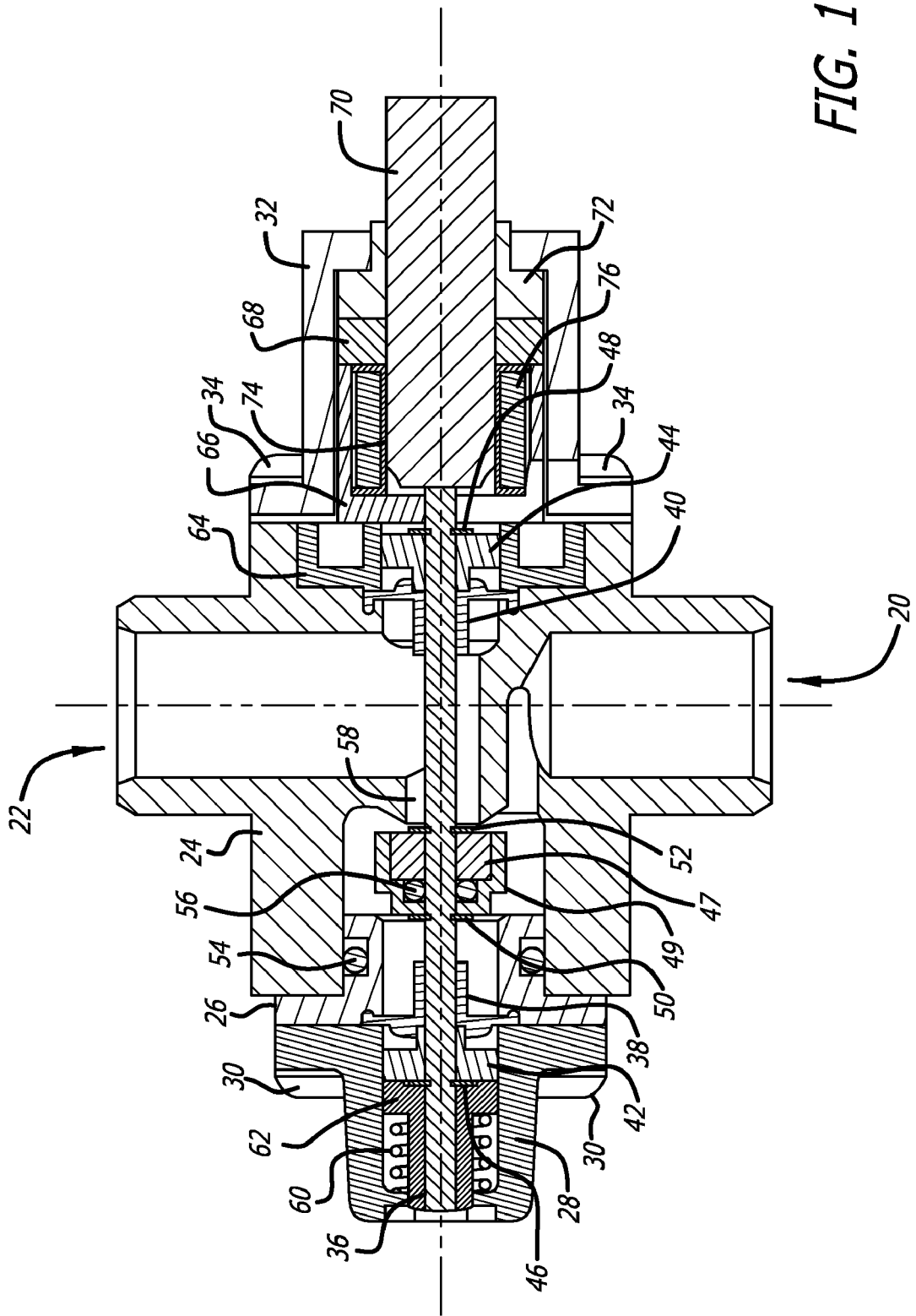
FIG. 1 is a cross-section assembly drawing of the valve.

FIG. 1 is a cross-section of the valve of one embodiment of the present invention taken through the inlet 20 and outlet 22 of the valve. The valve body 24 supports, at the left side thereof, what is referred to herein as a lower diaphragm support 26 and a spring housing 28 fastened to the valve body 24 by screws 30. At the right side of FIG. 1, the valve body 24 supports an actuator housing 32 held in place by screws 34. Within the valve body is a shaft 36 sealed against leakage by diaphragms 38 and 40, retained in position on the shaft by center diaphragm supports 42 and 44, which in turn are held in position by spring clips 46 and 48 in grooves in shaft 36.

The shaft 36 supports a seat rubber 47 within seat rubber housing 49, also held in position on the shaft by spring clips 50 and 52. O-ring 54 provides a seal between the valve body 24 and the lower diaphragm support 26, with O-ring 56 providing a further seal along shaft 36 whenever the seat rubber 46 is forced against seat 58 in the valve body. At the left end of the assembly of FIG. 1, a preloaded spring 60 pushes against a spring guide 62, which in turn pushes against the spring clip 46 and center diaphragm support 42 to encourage shaft 36 and the various parts coupled thereto toward the right.

At the right side of the Figure is an actuator support 64 and a cup shaped magnetic lower frame 66 with an annular magnet 68 at the right end thereof. A magnetic plunger 70 has a slip fit in the magnet 68, with the end of the plunger touching the right end of shaft 36. The assembly of the lower frame 66 and magnet 68 is held in position by an upper frame 72 and the actuator housing 32. Also within the cup shaped lower frame 66 is a bobbin 74 with a coil of wire 76 thereon.

FIG. 1 actually shows the valve in an intermediate position between its open position and its closed position. In particular, when plunger 70 is pushed to its left-most position against the force of spring 60, the left face of plunger 70 will abut the adjacent face of lower frame 66 to form a substantially zero air gap magnetic circuit having a circuit portion comprised of lower frame 66 and the magnet 68 and a second portion comprising the plunger itself. This is a substantially zero air gap magnetic circuit because the left face of plunger 70 is in contact with the adjacent face of lower frame 66 and for the reason that the plunger 70 is a slip fit within magnet 68. Thus there is a substantial magnetic force that will hold the plunger 70 in its left-most position, the magnetic force and the spring force of spring 60 being portioned so that when the plunger is in its left-most position, the magnetic force will exceed the spring force to hold the valve in the open position. However, a current pulse through coil 76 of sufficient amplitude and duration and of appropriate sense will sufficiently reduce the magnetic flux density between the left face of plunger 70 and the adjacent face of lower frame 66 to reduce the magnetic force on plunger 70 to a magnitude less than the force of spring 60. Thus upon occurrence of such a pulse, spring 60 will cause shaft 36 and the parts attached thereto, as well as plunger 70, to move their right-most position, forcing seat rubber 47 against seat 58 in the valve body 24 to close the valve. When closed, seat rubber 46 will be firmly against seat 58 to seal against the seat, with O-ring 56 sealing along the shaft 36 to help prevent valve leakage. When the current pulse through coil 76 is terminated, the valve will stay in the closed position because the air gap now existing between the left face of plunger 70 and the adjacent face of lower frame 66 limits the flux density recovery in this area, thereby providing a magnetic valve opening force which is now less than the force of spring 60 holding the valve closed. The valve may be manually reset, however, by pushing plunger 70 to the left-most position, opening the valve and again magnetically latching the valve in the open position with the left face of plunger 70 against the adjacent face of lower frame 66.

Figure 2:
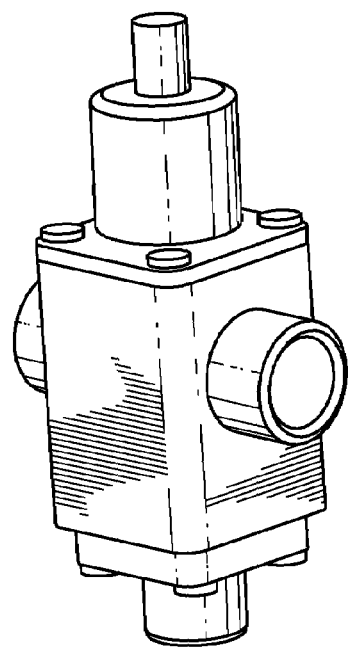
FIG. 2 is a full view of the assembled valve.

FIG. 2 is a view of the assembled valve without electronics. The parts viewable in that assembly are the valve body 24 with inlet and outlet ports 22, the actuator housing 32 held on by screws 34, plunger 70, lower diaphragm support 26 and spring housing 28 held in the assembly by screws 30.

Figure 3:
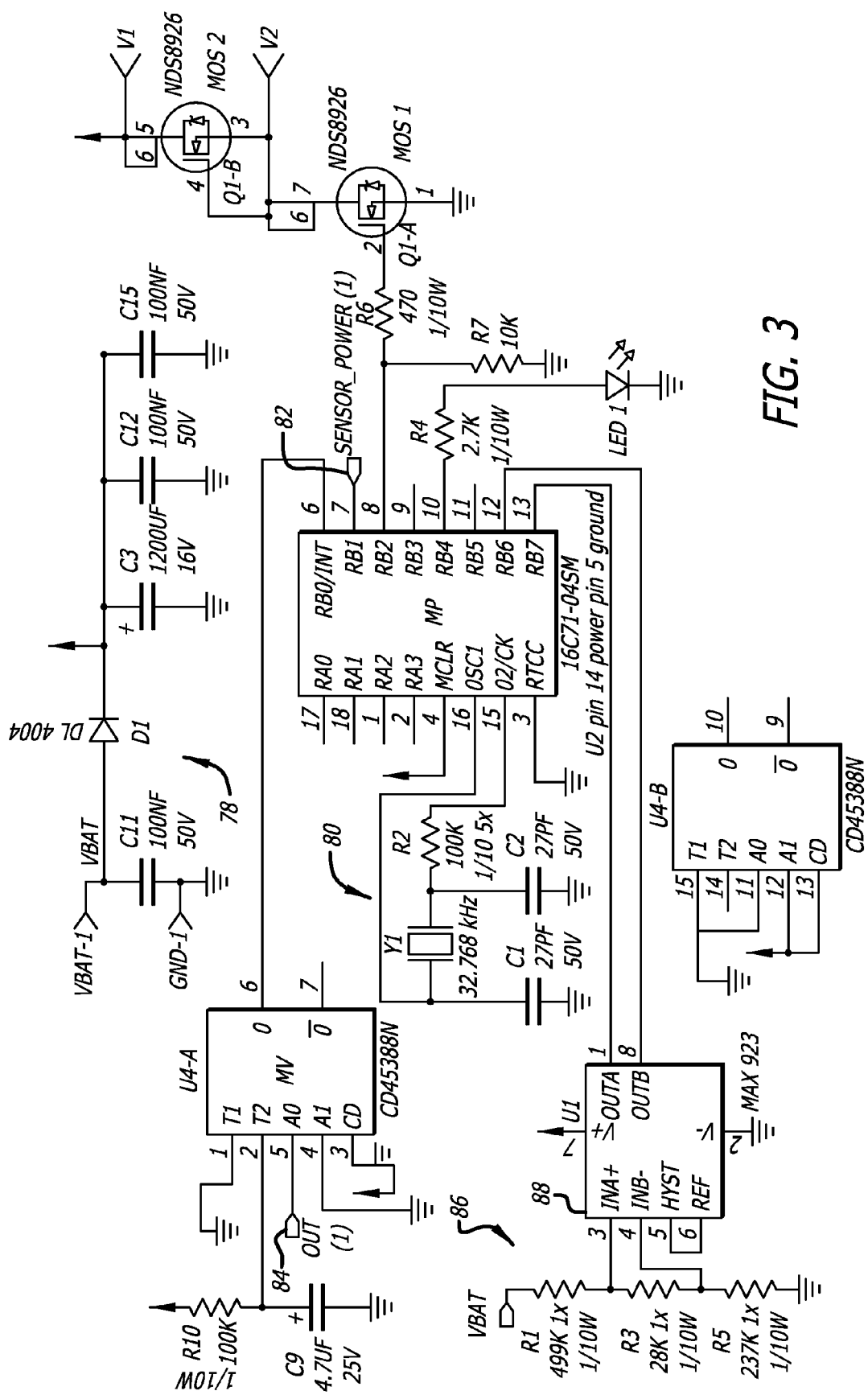
FIGS. 3 and 4 are circuit diagrams of the electronics used with the preferred embodiment of the present invention.
Figure 4:
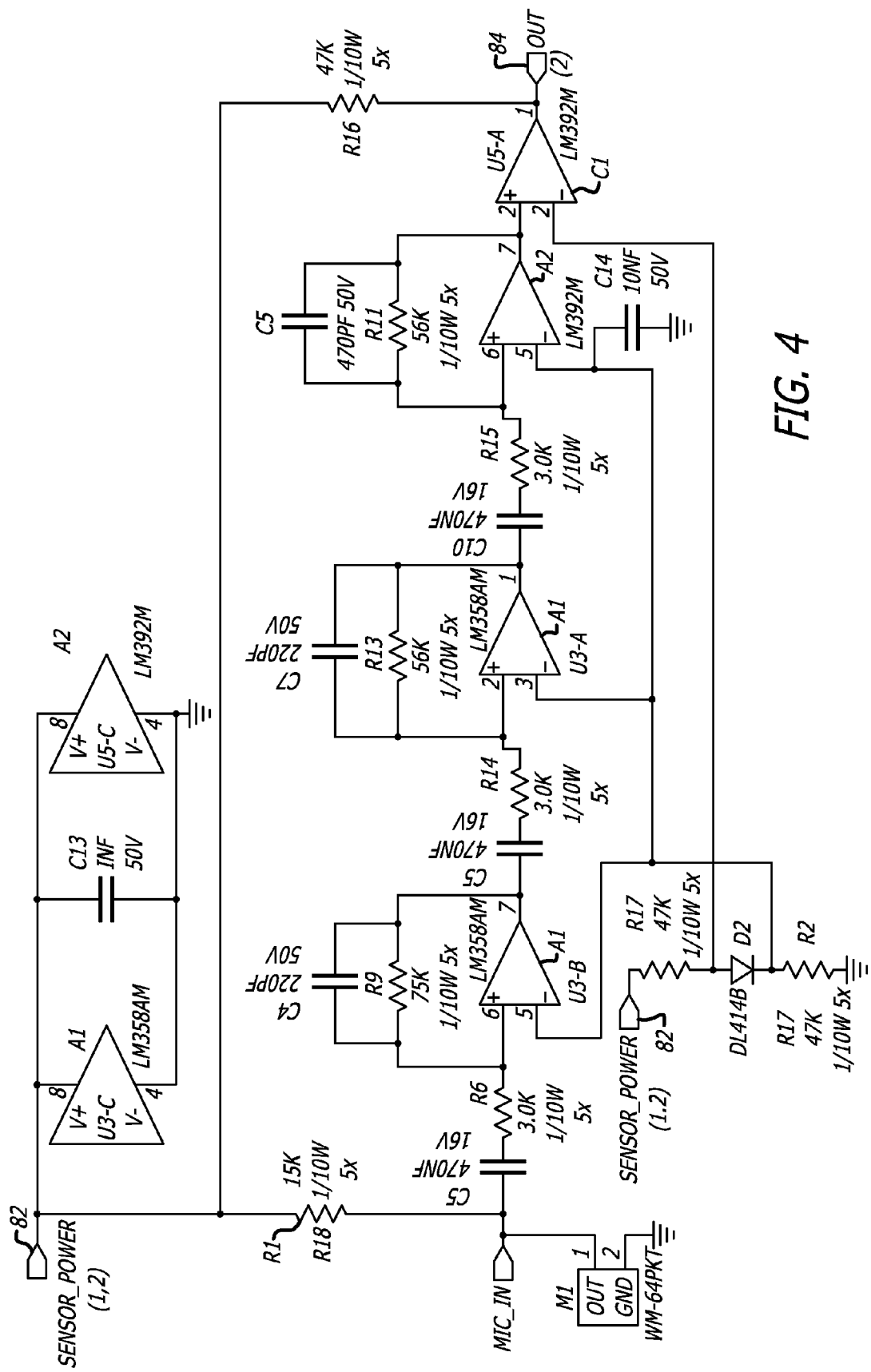

The electronics for controlling the fluid sensing shut-off device of the preferred embodiments of the present invention may be seen in FIGS. 3 and 4. The upper part of FIG. 3, generally indicated by the numeral 78, merely illustrates the battery power supply, in a preferred embodiment comprising three AA batteries with various size capacitors suppressing noise and diode D1 providing reverse voltage protection. In the lower part of the circuit of FIG. 3 is a microprocessor (μP) with a conventional crystal oscillator circuit 80 providing a reference clock input for the microprocessor. The microprocessor is programmed to periodically wake up from a sleep mode and provide sensor power on line 82, which powers the circuit on FIG. 4, specifically applying sensor power through resistor R1 to a flow sensor, in a preferred embodiment a microphone M1, as well as to power dual operational amplifiers A1, operational amplifier A2 and comparator C1. The microphone M1 is disposed within the body of the valve in the final assembly and may touch the body or be slightly spaced from the body, though in either event, responding to the flow noise of fluid flowing through the open valve. Amplifiers A1 and A2 have the positive inputs thereto biased by the voltage across resistor R2, with the positive input to comparator C1 being one diode voltage drop higher than that voltage as a result of the voltage drop across diode D2. Consequently when there is no fluid flow, and thus no microphone input, the outputs of amplifiers A1 and A2 will be equal to the voltage on their positive inputs, namely, one diode voltage drop below the positive input to comparator C1. Thus with no flow the output of the comparator on line 84 will be high. This holds the output of the precision monostable multi-vibrator MV fixed pr stable, which is sensed by the microprocessor μP before reentering the sleep mode. If, however, flow has been initiated through the valve through the opening of another valve in series therewith, the flow sensor, microphone in the preferred embodiment, will provide an output that when amplified by amplifiers A1 and A2 of FIG. 4, will cause the output of comparator C1 to oscillate, thereby triggering the multi-vibrator MV to provide an alternating state output to the microprocessor μP. The microprocessor, on sensing that alternating input, will start timing the duration of that alternating input until either the alternating input stops or the time of flow reaches a predetermined duration, after which the microprocessor will turn on MOSFET MOS1 to apply the voltage V1, V2 across the coil of the valve of FIG. 1. In that regard, MOSFET MOS2 is merely diode connected to absorb the back EMF from the coil when MOSFET MOS1 is subsequently turned off. The microprocessor μP will turn on MOSFET MOS1 long enough to reduce the magnetic field and thus the magnetic force pulling plunger 70 to the left-most position, allowing spring 60 to force the valve to the right-most or closed position, after which the current pulse may be terminated, with the valve remaining in the closed state until plunger 70 is again manually pushed to the left as viewed in FIG. 1.

Also shown in FIG. 3 is a low voltage sensing capability. In particular, a voltage divider generally indicated by the numeral 86 provides two measures of the battery voltage VBAT to a dual ultra-low power comparator 88 with internal reference, which will provide two outputs, one indicating a low battery (the word battery as used herein an in the claims including multiple batteries) and the other output indicating the battery is so low as to risk malfunction of the sensing system if the valve is not immediately closed. Thus on first sensing the low battery, the microprocessor will provide an output to cause a low frequency flashing of light-emitting diode LED1, with a still lower battery voltage indication causing the microprocessor to pulse MOSFET MOS1 on to close the valve.

Figure 5:
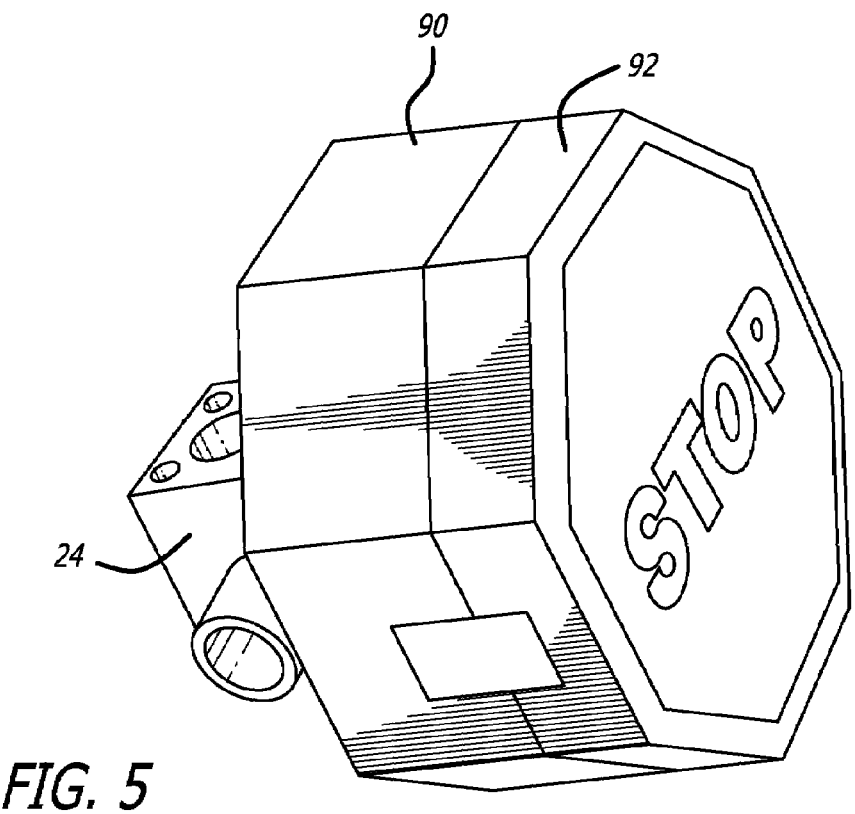
FIG. 5 is an illustration showing the configuration and mounting of the electronics and power supply to the valve body of the preferred embodiment.

Now referring to FIG. 5, the manner in which the electronics and battery power supply attach to the valve body 24 may be seen. In particular, case 90 houses a printed circuit board with the microprocessor μP and other electronics therein, with cover 92 covering the three AA batteries for the battery power supply. The microphone in the preferred embodiment is mounted on the printed circuit board itself and extends into the valve body 24 for picking up the sound and vibrations from the turbulent fluid flow through the valve.

The preferred embodiment of the present invention is intended for use in the water supply line for a toilet to shut off the water flow in the event the normal toilet water flow shut-off valve malfunctions for any reason. However, the present invention may be used in other instances to preserve water or protect property in systems wherein normal water flow either occurs for a predetermined time period, or at least for a predetermined maximum time period. For instance, one such other use may be in the water supply line to an ice cube maker in a refrigerator. In this application, if the solenoid valve supplying water to the ice cube maker locks in the valve open condition, substantial property damage can result unless an automatic backup shut-off valve is used, such as the present invention valve. Other applications could include dishwashers and clothes washers, irrigation systems, and the like, wherein much water can be wasted and substantial damage property can result from a valve stuck in the on position. In that regard, valve systems in accordance with the present invention may readily be scaled to accommodate large or small flows as required. By having the microprocessor in the sleep mode a large majority of the time, battery life in the system of the present invention may approach the shelf life of the batteries. Obviously the valve systems of the present invention could be powered from 110V AC power, though battery power is preferred to minimize installation difficulty and cost. Also while a microphone and microprocessor based system has been disclosed herein, obviously other types of flow sensors and control electronics may be used as desired. In that regard, the flow duration before automatic shut-off could be varied for different applications, and if desirable, could be made field programmable. Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:
1. A fluid sensing shut-off device comprising:
a valve having a valve open position allowing fluid flow between a valve inlet and a valve outlet, and a valve closed position preventing flow between the valve inlet and the valve outlet;

the valve being encouraged to the valve closed position by a spring force;
a stationary magnetic circuit portion;
a magnetic member moveable within the magnetic circuit between first and second positions, the magnetic member forming a closed magnetic circuit having a substantially zero air gap and disposed to hold the valve in the valve open position when in the first position;
one of the stationary magnetic circuit portion and the magnetic member including a permanent magnet, the permanent magnet magnetically holding the magnetic member in the first position with a magnetic force exceeding the spring force once moved to the first position;
a coil disposed to temporarily decrease the magnetic force to less than the spring force on receipt of a current pulse in the coil to allow the spring force to move the magnetic member to its second position and to allow the spring force to move the valve to the closed position;
a sensor configured to sense fluid flow through the valve, independent of the destination of that fluid;
a timer coupled to the sensor to sense the length of time of fluid flow; and,
circuitry coupled to the timer to provide a current pulse to the coil if a duration of fluid flow exceeds a predetermined time limit to allow the spring force to move the valve to the valve closed position;
the fluid sensing shut-off device being manually operable to return the magnetic member to its first position and the valve to the open position to be magnetically retained at the respective positions without providing a current pulse or other electrical power to the coil.

2. The device of claim 1 wherein the permanent magnet is included in the stationary magnetic circuit portion.

3. The device of claim 1 wherein the sensor comprises a microphone disposed to sense fluid flow through the valve.

4. The device of claim 1 wherein the sensor, the timer and the circuitry coupled to the timer to provide a current pulse to the coil are battery powered.

5. The device of claim 4 wherein the sensor is periodically powered to sense fluid flow.

6. The device of claim 5 wherein the sensor and timer are configured to remain powered when flow is sensed until flow stops or the circuitry coupled to the timer provides a pulse to the coil to move the valve to the valve closed position.

7. The device of claim 4 further comprising a battery voltage sensor for sensing and indicating a low battery voltage.

8. The device of claim 7 further comprising circuitry for pulsing the coil to move the valve to the valve closed position before the battery discharges to a level inadequate to pulse the coil to move the valve to the valve closed position.

9. The device of claim 1 further comprising a microprocessor.

10. The device of claim 9 wherein the timer is a microprocessor operating under program control.

11. The device of claim 10 wherein the microprocessor is programmed to spend most it its time in a sleep mode, and to periodically wake up and power the sensor to determine if fluid is flowing through the valve.

12. The device of claim 11 wherein the microprocessor is programmed to continue powering the sensor once fluid flow is sensed at least until either fluid flow stops or the duration of fluid flow exceeds the predetermined time limit and the coil is pulsed.

13. The device of claim 12 further comprising a battery voltage sensor for sensing and indicating a low battery voltage, the microprocessor being coupled to the output of low battery voltage sensor and programmed to flash a visible warning when a low battery voltage is sensed.

14. The device of claim 13 wherein the microprocessor is also programmed to cause a current pulse to the coil to move the valve to the closed position before the battery becomes too discharged.

15. A water sensing shut-off device comprising:
a valve having a valve open position allowing water flow between a valve inlet and a valve outlet, and a valve closed position preventing flow between the valve inlet and the valve outlet;
the valve being encouraged to the valve closed position by a spring force;
a stationary magnetic circuit portion;
a magnetic member moveable within the magnetic circuit between first and second positions, the magnetic member forming a closed magnetic circuit having a substantially zero air gap and disposed to hold the valve in the valve open position when in the first position;
one of the stationary magnetic circuit portion and the magnetic member including a permanent magnet, the permanent magnet magnetically holding the magnetic member in the first position with a magnetic force exceeding the spring force once moved to the first position;
a coil disposed to temporarily decrease the magnetic force to less than the spring force on receipt of a current pulse in the coil to allow the spring force to move the magnetic member to its second position and to allow the spring force to move the valve to the closed position;
a sensor configured to sense water flow though the valve, independent of the destination of the water flow;
a timer coupled to the sensor to sense the length of time of water flow; and,
circuitry coupled to the timer to provide a current pulse to the coil if a duration of water flow exceeds a predetermined time limit to allow the spring force to move the valve to the valve closed position;
the water sensing shut-off device being manually operable to return the magnetic member to its first position and the valve to the open position to be magnetically retained at the respective positions without providing a current pulse to the coil.

16. The device of claim 15 wherein the permanent magnet is included in the stationary magnetic circuit portion.

17. The device of claim 15 wherein the sensor comprises a microphone disposed to sense water flow through the valve.

18. The device of claim 15 wherein the sensor, the timer and the circuitry coupled to the timer to provide a current pulse to the coil are battery powered.

19. The device of claim 18 wherein the sensor is periodically powered to sense water flow.

20. The device of claim 19 wherein the sensor and timer are configured to remain powered when flow is sensed until flow stops or the circuitry coupled to the timer provides a pulse to the coil to move the valve to the valve closed position.

21. The device of claim 18 further comprising a battery voltage sensor for sensing and indicating a low battery voltage.

22. The device of claim 21 further comprising circuitry for pulsing the coil to move the valve to the valve closed position before the battery discharges to a level inadequate to pulse the coil to move the valve to the valve closed position.

23. The device of claim 15 further comprising a microprocessor.

24. The device of claim 23 wherein the timer is a microprocessor operating under program control.

25. The device of claim 24 wherein the microprocessor is programmed to spend most it its time in a sleep mode, and to periodically wake up and power the sensor to determine if water is flowing through the valve.

26. The device of claim 25 wherein the microprocessor is programmed to continue powering the sensor once water flow is sensed at least until either water flow stops or the duration of water flow exceeds the predetermined time limit and the coil is pulsed.

27. The device of claim 26 further comprising a battery voltage sensor for sensing and indicating a low battery voltage, the microprocessor being coupled to the output of low battery voltage sensor and programmed to flash a visible warning when a low battery voltage is sensed.

28. The device of claim 27 wherein the microprocessor is also programmed to cause a current pulse to the coil to move the valve to the closed position before the battery becomes too discharged.

* * * * *